Sept. 22, 1936.    A. KOTTMANN    2,054,904
AUTOMATIC OPERATING DEVICE FOR USE WITH CALCULATING MACHINES
Filed Sept. 8, 1931    8 Sheets-Sheet 1
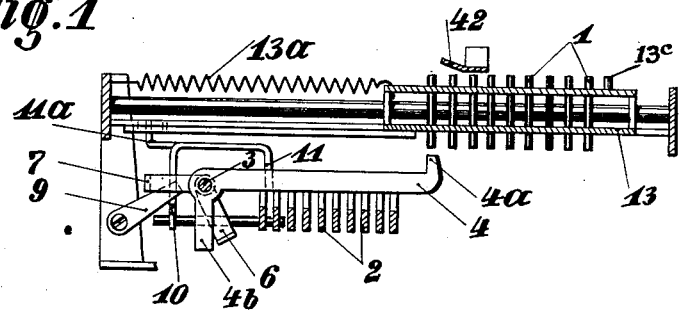
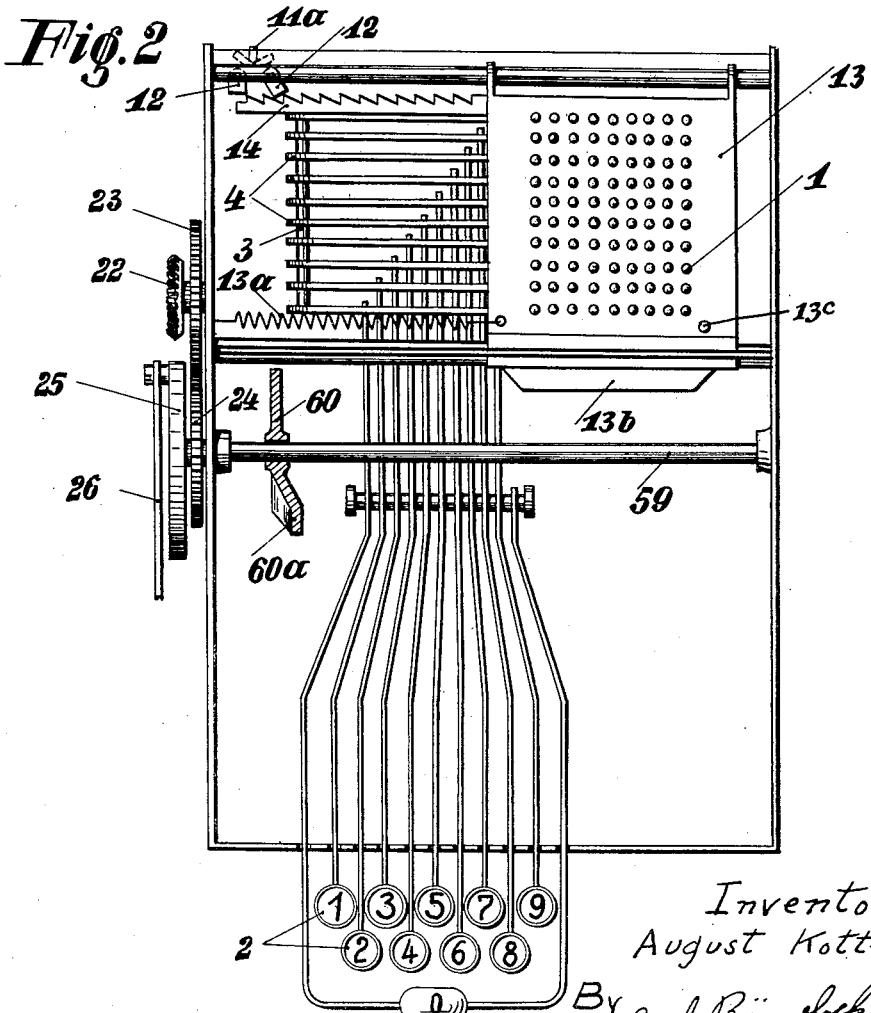
Inventor:
August Kottmann
By Emil Bömelcke
Attorney

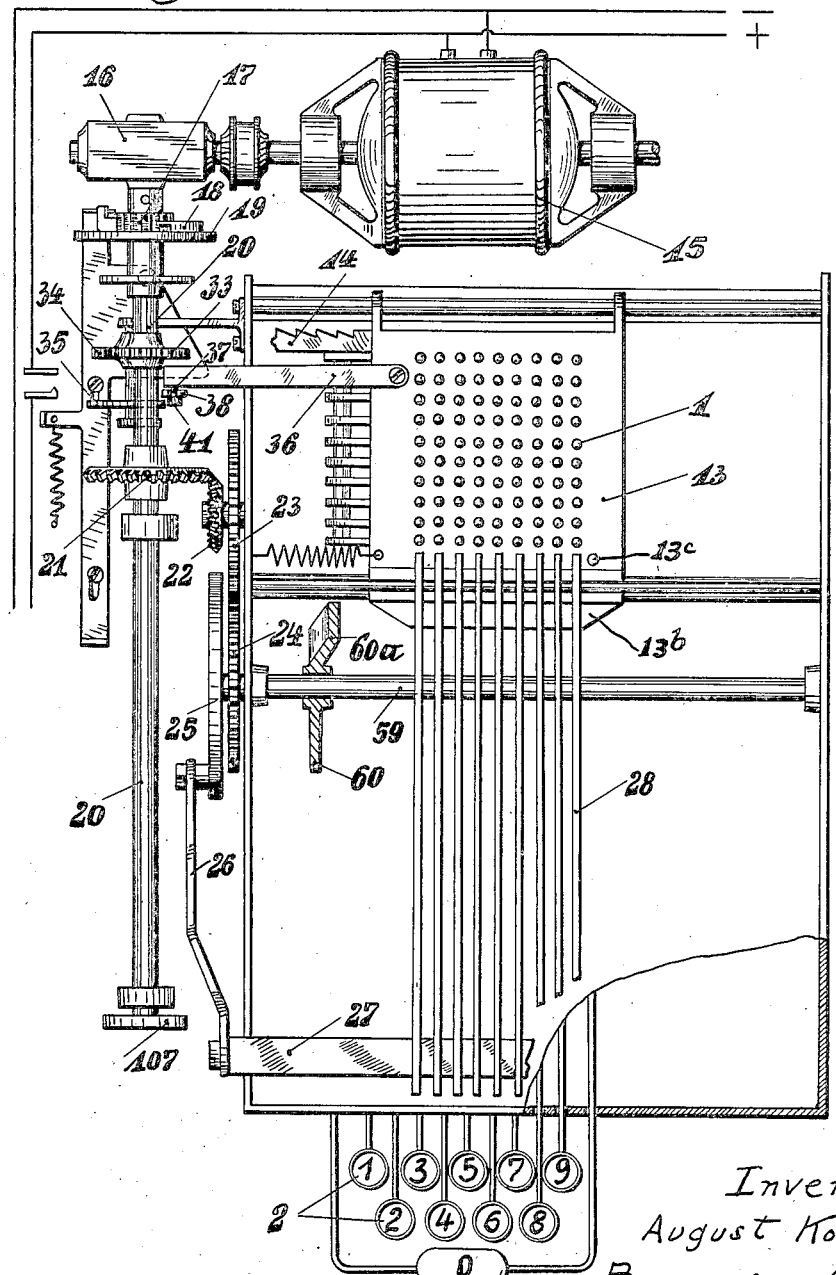

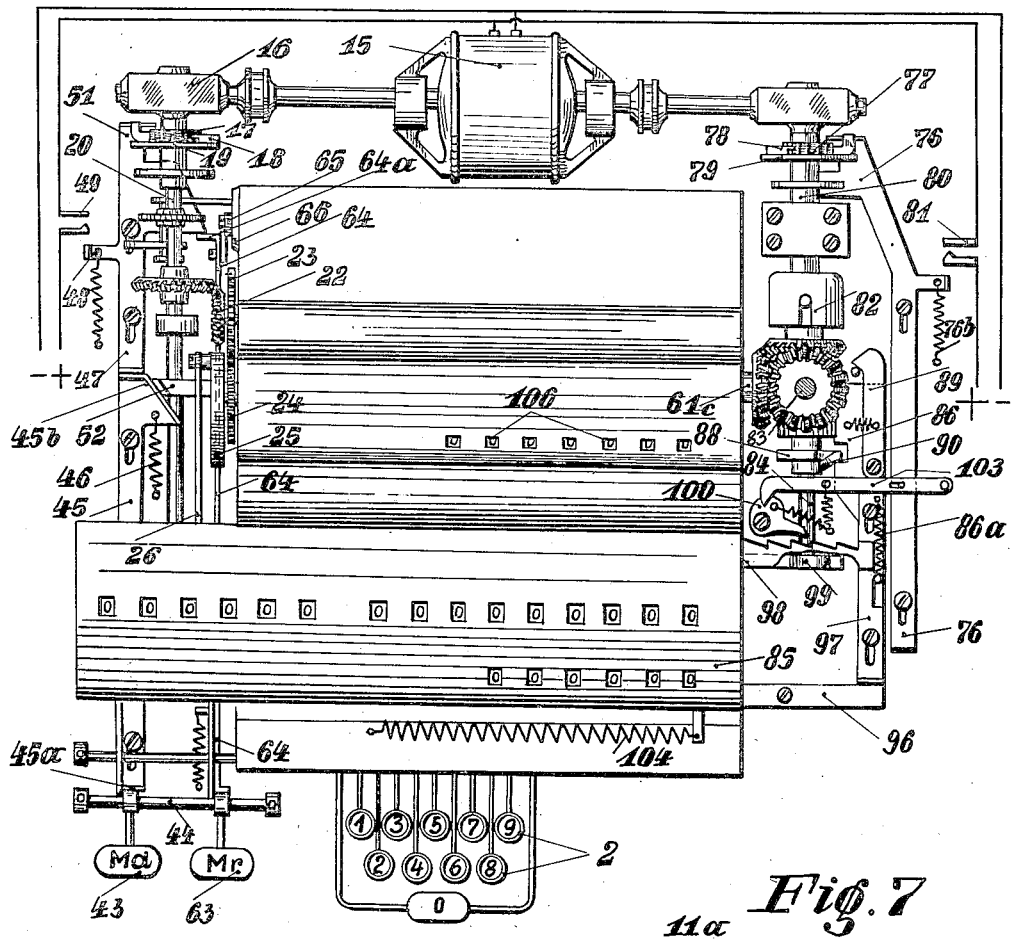

Sept. 22, 1936. A. KOTTMANN 2,054,904
AUTOMATIC OPERATING DEVICE FOR USE WITH CALCULATING MACHINES
Filed Sept. 8, 1931 8 Sheets-Sheet 4

Inventor:
August Kottmann
By Emil Bönnelycke
Attorney

Sept. 22, 1936.　　　　A. KOTTMANN　　　　2,054,904
AUTOMATIC OPERATING DEVICE FOR USE WITH CALCULATING MACHINES
Filed Sept. 8, 1931　　　　8 Sheets-Sheet 5
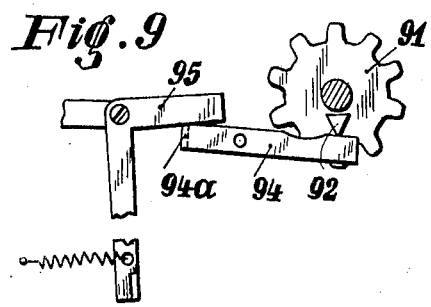
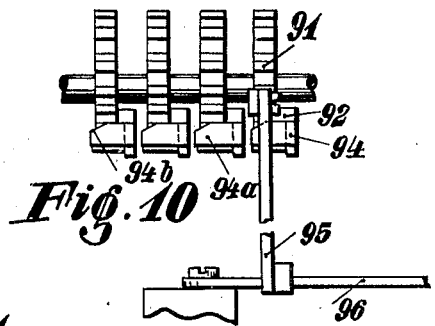
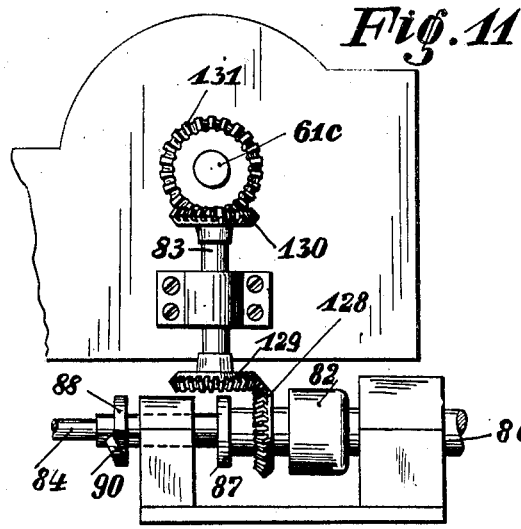
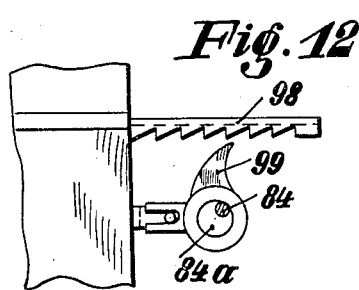
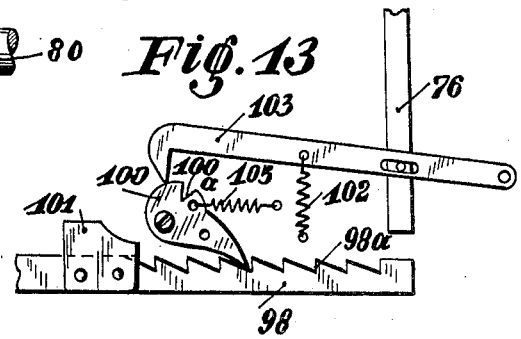
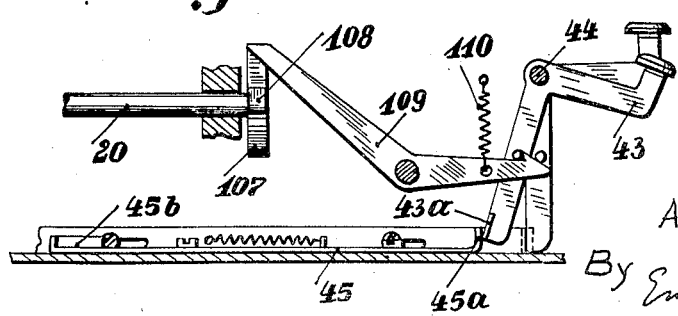
Inventor:
August Kottmann
By Emil Bönnelycke
Attorney Sept. 22, 1936.   A. KOTTMANN   2,054,904
AUTOMATIC OPERATING DEVICE FOR USE WITH CALCULATING MACHINES
Filed Sept. 8, 1931   8 Sheets-Sheet 6
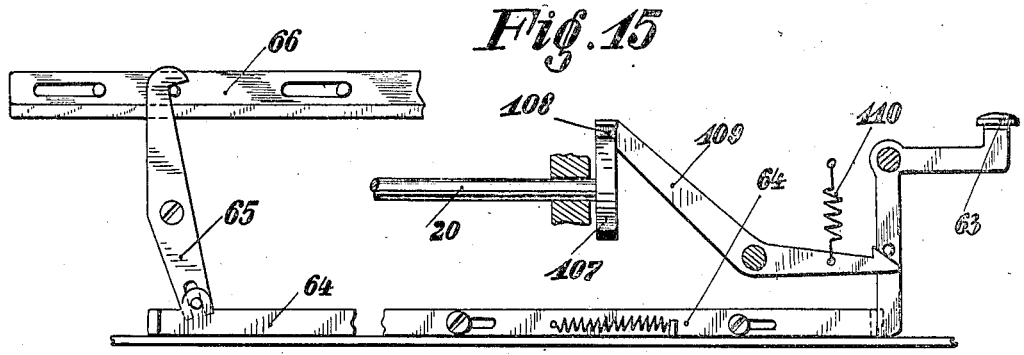
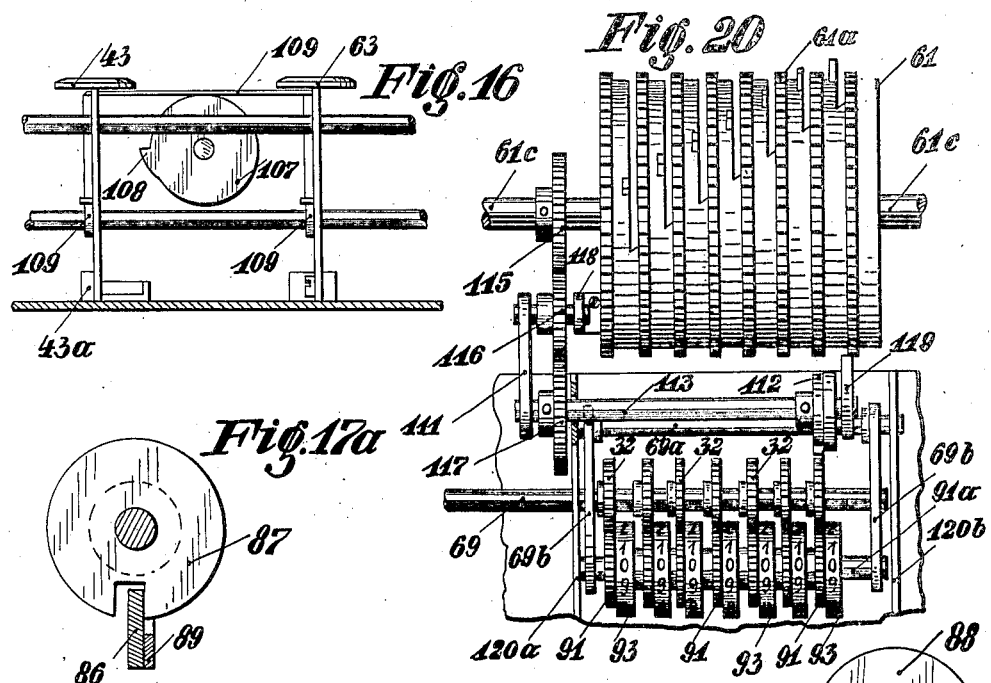
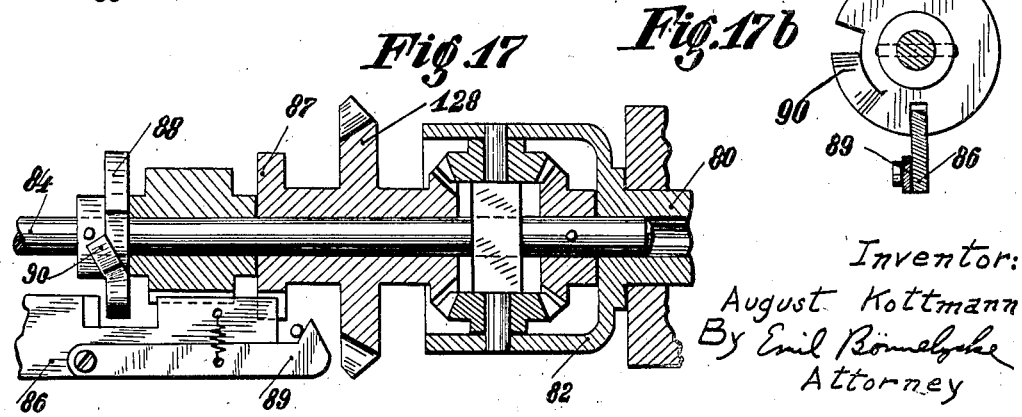
Inventor:
August Kottmann
By Emil Bönnelycke
Attorney Sept. 22, 1936.   A. KOTTMANN   2,054,904
AUTOMATIC OPERATING DEVICE FOR USE WITH CALCULATING MACHINES
Filed Sept. 8, 1931   8 Sheets-Sheet 7

Inventor:
August Kottmann
By Emil Bönnelycke
Attorney

Sept. 22, 1936. A. KOTTMANN 2,054,904
AUTOMATIC OPERATING DEVICE FOR USE WITH CALCULATING MACHINES
Filed Sept. 8, 1931 8 Sheets-Sheet 8

Inventor:
August Kottmann
By Emil Bonnelycke
Attorney

Patented Sept. 22, 1936

2,054,904

UNITED STATES PATENT OFFICE 2,054,904

AUTOMATIC OPERATING DEVICE FOR USE WITH CALCULATING MACHINES

August Kottmann, Sommerda, Germany, assignor to Rheinische Metallwaaren- und Maschinenfabrik Sommerda Aktiengesellschaft, Sommerda, Germany, a corporation of Germany Application September 8, 1931, Serial No. 561,806
In Germany September 13, 1930

2 Claims. (Cl. 235—78)

In the automatic calculating machine having an automatic multiplying device according to the application Serial No. 528,105 filed April 6, 1931 of which the present case is an improvement, the arrangement exists that the two factors of the multiplication problem are first pre-set into a presetting means (factor setting pin carriage), which is used in common for both factors, and thereupon are transferred either into the actuators of the register drive mechanism or into the actuators of the multiplying device. The transfer is accomplished by means of a power operated mechanism which transfers the factors under the control of two selecting devices (multiplicand key and multiplier key). The transfer drive, after it has accomplished the transfer of the factors, returns the factor setting pin carriage, which was shifted by the setting up of a factor, to its original position, and simultaneously clears or zeroizes the setting pins.

In accordance with the present invention, shifting rods for rendering the main drive mechanism operative and inoperative are actuated by the movement of the factor setting carriage in its return to initial position after completion of a transfer under the control of an intermediate member brought into its operative position only by that selector key which determines the transfer of the second factor, whereby the power drive is clutched to the main drive shaft of the calculating machine and the multiplication is carried out.

The device in accordance with the invention has the advantage that the key for rendering the motor operative and the manual operation necessary for operating the same are eliminated.

The machine is illustrated on the accompanying drawings in which:

Fig. 1 is a side elevation of the factor setting pin carriage with the setting pins, partly in section;

Fig. 2 is a top view showing the factor setting pin carriage and its keyboard;

Fig. 3 is a plan view of the operating means for the rack bars which transfer the factor digits;

Fig. 4 is a plan view of a calculating machine with the drive and control elements exposed to view;

Fig. 6 is a sectional detail elevation of the back-travel and clearing device of the factor setting pin carriage;

Fig. 7 is an elevation of a switching device for moving the factor setting pin carriage;

Fig. 9 is a detail side elevation of the drive device for moving of the register mechanism;

Fig. 10 is a rear elevation of the drive means illustrated in Fig. 9;

Fig. 11 is a detail elevation of the moving device for the register operating gearing of the calculating machine;

Fig. 12 is a detail elevation of the drive means for moving the register mechanism;

Fig. 13 is an elevation of a locking pawl for the rack bar of the register mechanism moving means;

Fig. 14 is a partly sectional elevation of the selecting key which causes the engaging of the clutching elements of the register drive means;

Fig. 15 is a partly sectional elevation of the selecting key which causes the engaging of the clutching elements of multiplying mechanism;

Fig. 16 is an elevation of a latching and unlatching drive for both selecting keys;

Fig. 17 is a detail view, partly in central longitudinal section, showing the differential mechanism of Figs. 4 and 11 on a larger scale;

Fig. 17a is a side view of one of the locking elements of Fig. 17 with the slide bar in section;

Fig. 17b is a similar view of another locking element;

Fig. 20 is a side view of further details associated with the setting discs;

Figure 5:
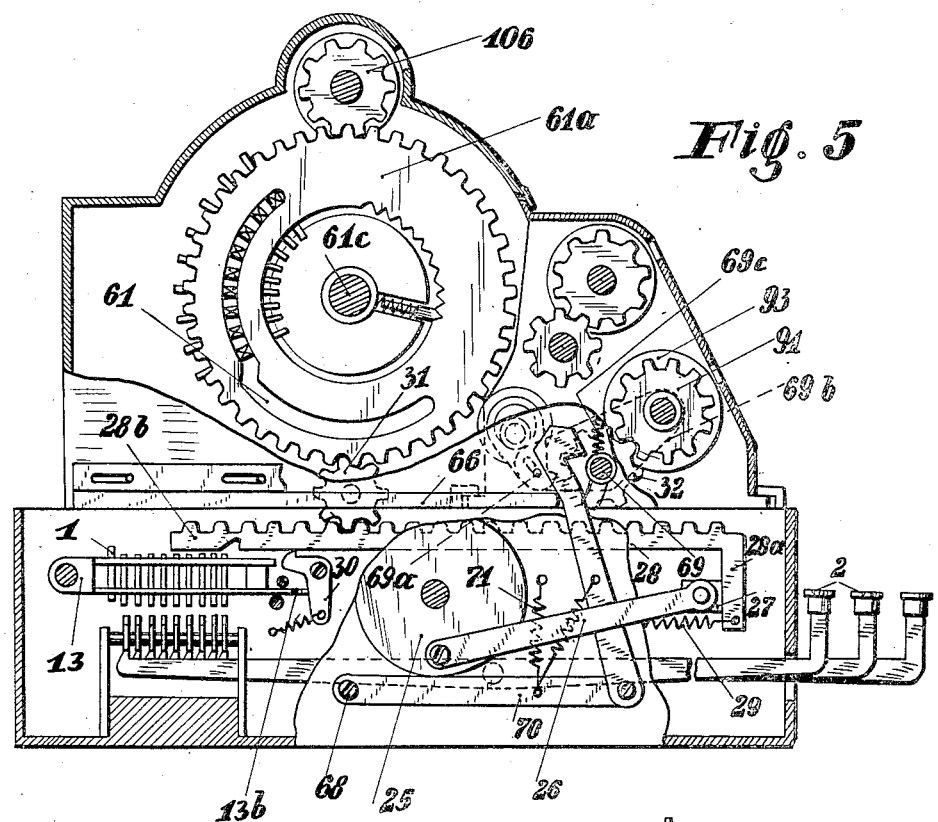
Fig. 5 is a partly sectional side elevation of the calculating machine.

The factor setting rods 1 are set by the keys 2 whose key levers move the intermediate levers 4 which rotate about the shaft 3 and which, by means of their hammer-like heads 4a, force the setting pins 1 out of their position of rest.

If one of these intermediate levers 4 is lifted by means of the keys 2, then the short arm 4b thereof will press against the bail 6, likewise moving about the shaft 3. The said bail 6, by means of its angle-shaped end 7 and the pawl 9 engaged thereby and which is oscillatable about the screw 8, will turn the angle bail 11 (Fig. 7). This in turn actuates the anchors 12 which engage in the rack bar 14 (Fig. 2) and thus causes the setting element carriage 13, driven by a spring 13a, to move into the next decimal position.

Corresponding to the number of rows of setting pins, there are rack bars 28 (Figs. 3 and 5) supported above the factor setting carriage 13, which have downwardly extending portions 28a which abut against a slide element 27. The slide element 27 is set into horizontal reciprocating movement by the motor 15, supported behind the calculating machine, through the gearing 16, drive element 17, clutch pawl 18, clutch disc 19, shaft 20, bevel gears 21 and 22, gear wheels 23 and 24, crank disc 25 and connecting rod 26.

In the position of rest of the drive shaft 20 the slide element 27 in Fig. 5 lies at the extreme right and moves to the left only upon the first half revolution of the crank disc 25, to return into the initial position upon the second half revolution.

The rack bars 28 are drawn to the left by the springs 29 and are thereby in position to follow the movements of the slide elements 27, in case they are not secured in the initial position by the latch 30 provided for each rack bar.

The latches 30 are disengaged by a projection 13b (Figs. 2 and 5) on the setting pin carriage 13, in the forward shifting of the latter, in such way that always only those rack bars under which rows of setting rods or pins lie can follow the slide element 27 (Figs. 5 and 6). When the carriage 13 shifts laterally, only those latches 30 which lie above it will be actuated thereby.

If any setting pin 1 in the carriage 13 is struck by means of the keyboard 2, the same will project into the field of movement of the rack bar 28 lying above the same. If the slide element 27 is now set into motion by means of the crank disc 25 and connecting rod 26, the rack bar 28 will follow the same until it abuts with its end 28b against the setting pin 1, whereby the magnitude of movement of the rack bar 28 constitutes a measure for the digit at that time corresponding to the setting pin 1.

Over each of the rack bars 28 which provide for transferring the digits set up by the factor setting pins selectively either into the register actuators or calculating drive wheels 61 or into the multiplier mechanism 62 etc., there are two gear wheels 31 and 32 (Fig. 5), of which one set is in engagement with the setting discs 61 of the pin wheels (register actuators) and the others with the elements 91 of the multiplying device which are to be set, and whereof as selected the one set or the other may be brought into engagement with the rack bars 28 upon the return of the slide element 27 and the latter, so that upon the return of the rack bars their movement corresponding to the preset digits would be transferred either to the register drive means or to the multiplying device. Hereinafter it will be further explained how these gear wheels 31 and 32 are brought into or out of engagement with the rack bars 28.

A bar 36 (Figs. 3 and 6) is secured to the factor setting pin carriage 13 and engages, by means of a rod 37, a fork 38 of a shift lever 40, pivoted about a shaft 39. Upon the lever 40 there is a lug 41, which, due to the carriage 13 moving to the left during the setting operation, approaches a cam 35, moved by the shaft 20, through the gear wheels 33 and 34, so that the factor setting pin carriage 13 is again pressed back into the initial position by this cam after completion of the digits transfer. The inclined surface 42 (Fig. 1) provided over the carriage 13 and below which the pins thereof pass on the return provides for "clearing" or restoring the pins 1.

When the setting of the number in the carriage 13 has been accomplished and the transference of the same to the register drive mechanism as a multiplicand is desired, then the "multiplicand" key 43 (Figs. 4, 14, and 16) arranged in front of the machine, designated "Md", should be actuated. The key 43 is pivoted about the shaft 44 and is so constructed that upon depressing it its end 43a presses against the surface 45a of the slide bar 45 and shifts the same against the force of the spring 46 (Fig. 4). The slide bar 45 on the one hand carries along the bar 47, which by means of the projection 48 closes the switch 49 for supplying current to the motor 15 and by means of its end 51 releases the clutch pawl 18 and thereby provides connection between the driver 17 and the clutch disc 19 so that now the motor 15 will set the shaft 20 into rotation.

The slide bar 45 simultaneously forces the slide element 52 to the right by means of the incline 45b and thereby shifts the angle lever 53 (Fig. 8) about its pivot.

Figure 8:
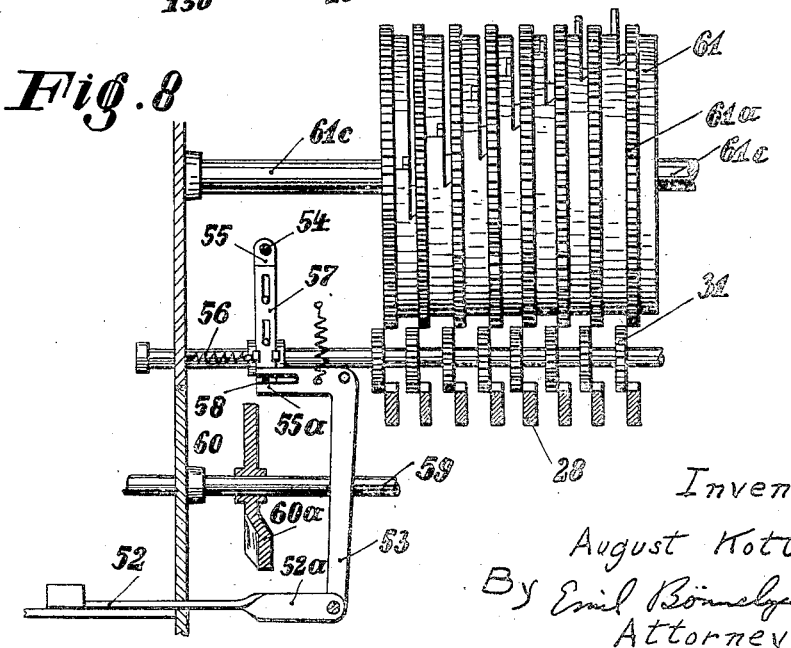
Fig. 8 is a partly sectional elevation of the clutch device between the rack bars and the setting discs of the stepped wheels.
Figure 18:
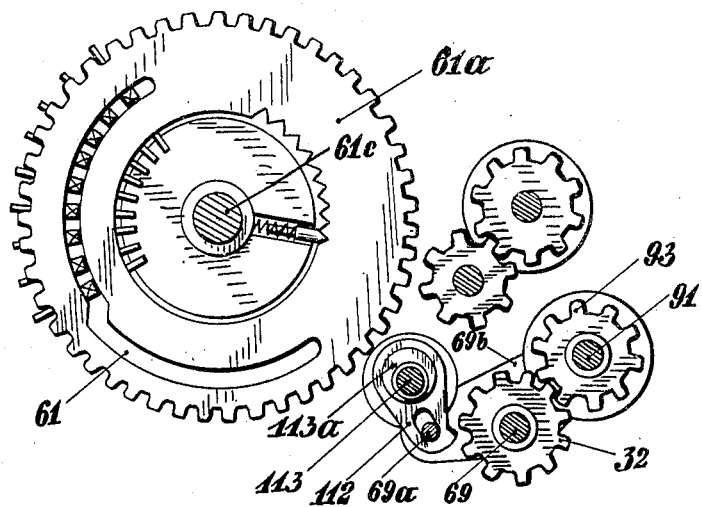
Fig. 18 is an end view, partly in section, of the setting discs and associated parts.
Figure 19:
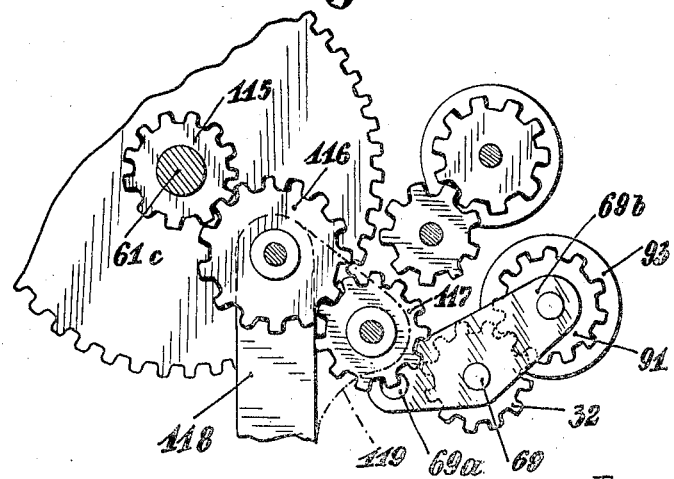
Fig. 19 is a side view of Fig. 18.
Figures 21, 22:
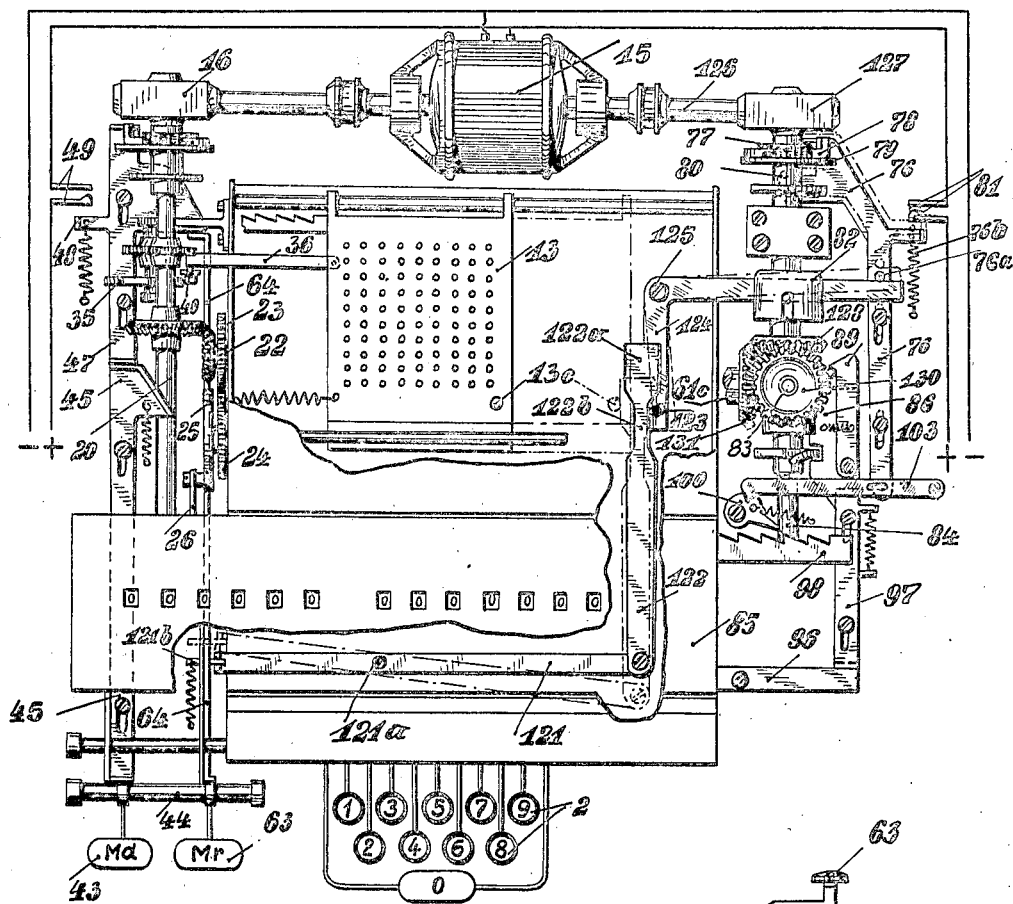
Fig. 21 is a plan view of the machine showing further details.
Fig. 22 is a side elevation of the mutliplier key.

The fork-like end 55a of the angle lever 53 encompasses the rod 58 of the latch 57, which is shiftable on the lever 55 pivotally arranged about the point 54. The lever 55 is connected with the shaft 56 by suitable means in such manner that it is capable of shifting the latter for a desired distance in the direction of its length, when it itself is moved. When the latch 57 in Fig. 8 is moved downwardly by the angle lever 53, it projects into the field of action of the cam 60, rotating with the shaft 59. Shaft 59 is operated by the gear wheel 24 already mentioned. If the shaft 59 and thereby the cam 60 is set into rotation, then during the second half of the revolution, that is, during the return of the rack bars 28, the latch 57, the lever 55, and the shaft 56 are forced to the right by the bulge 60a, so that the gear wheels 31 (Fig. 5) set upon the shaft 56 will come into engagement with the discs 61 of the pin wheels and with the rack bars 28, and thus provide a possibility of transferring from one part to the other. The number preset in the setting pin carriage is therefore transferred to the register drive mechanism.

An indicating mechanism 106 (Fig. 5) in engagement with the setting discs 61 permits supervision at all times of the value set in the pin wheels.

The shaft 69 which carries the toothed wheels 32 is mounted on two arms 69b capable of swinging around the shaft 69a of the numeral slide (Fig. 5). A spring 69c holds the shaft 69 in a raised position as long as it is not pulled downwardly by the hook 67.

Upon an extension of shaft 20 there is provided a cam disc 107 (Figs. 3, 14, 15, and 16) with a tooth 108. The latter is so arranged that after one revolution of the shaft 20 is nearly completed it lifts the latch bail 109, which by means of spring 110 secures the depressed key 43 in such depressed position, and thereby releases the key. At the instant that the key 43 is released, all the devices affected thereby are returned to their initial positions by means of suitably arranged springs. The shaft 20 driving the rack bars 28 therefore makes only one revolution, toward the end of which also the clutching wheels 31 providing the connection between the transfer rack bars 28 and the setting discs 61 of the pin wheels are again disengaged.

If the number preset in the factor setting carriage is to be transferred into the multiplication mechanism 62, that is, if the number is to be used as a multiplier, then the "multiplier" key 63 (Figs. 4, 15, and 16) designated "Mr" is depressed. From this key the switch controlling the motor is closed by means of the slide bar 47 and the clutch pawl 18 is released, that is, the drive is put in action. This is accomplished by key 63 coacting with and moving the member 64 (Fig. 4) which has at its rear end a projection 64a extending to the left abutting against the projection 47a of the slide bar 47. Furthermore, the lever 65 is so oscillated and the slider 66 so carried along, by the key 63, that the slider, as Fig. 5 shows, presses the hook 67 against the shaft 69 carrying the gear wheels 32.

The hook 67 (Fig. 5) is set into up-and-down swinging motion by means of the cam disc 25 and the lever 70, pivoted at the point 68, which is pressed against the said cam by the spring 71 in such manner that during the second half of the revolution of the cam disc 25, that is, during the return of the slide element 27 and the rack bars 28, it draws the shaft 69 downwardly and brings the gear wheels 32 into mesh with the rack bars 28. Inasmuch as the gear wheels 32 on the other hand are in engagement with the elements 91 of the multiplying device which are to be set, the number preset in the setting pins is transferred into the multiplying device.

The gear wheels 32 do not come out of mesh with the gear wheels 91 inasmuch as the shaft 69 of the gear wheels 32, as well as the shaft 91a (Fig. 5) of the gear wheels 91, and number wheels 93 are mounted in two links 62, which in turn are swingably mounted at 62a internally on the side walls of the housing of the registering mechanism. The spacing of the shafts 69 and 91a is therefore unchangeable. Both shafts are swung downwardly by the hook 67.

The hook 67 lies closely adjacent the left side wall of the machine frame in substantially the same plane as the crank disc 25 (Fig. 4) thus rather far to the left. It projects from below into the housing 85 of the registering mechanism which is open below. The number wheels 93 and the gear wheels 91 and 32 lie rather far to the right in the housing of the register, as may be seen from the location of the peep holes 93b (Fig. 4). The portion of the shaft 69 which comes into engagement with the hook 67 is therefore free from gear wheels 32 and can freely slide through under the hook 67 when the register mechanisms shift.

Similarly to the key 43 provided for the multiplicand, here also the locking pawl for the key 63 will be released after completion of the transfer, by the same device, and the elements depending thereon here also will return to their previous positions, while the supply of current to the motor is interrupted. Thus also in this transfer the shaft 20 completes only one revolution and the rack bars 28 make only a single to-and-fro motion.

As hereinafter described the setting of digits in the factor setting pin carriage and their transfer into the calculating machine shift the slide 76 in such a manner that it releases the clutching pawl 78 and thereby connects the driver 77 and the clutch disc 79 together and simultaneously closes the switch 81, so that the current is supplied to the motor 15. Thus the shaft 80 is driven.

By means of a known differential drive means 82 the rotations of the shaft 80 are selectively transferred to one of the other two shafts 83 and 84. Shaft 83 moves the register actuators 61, whereas shaft 84 actuates the register shifting mechanism 84a, 99 (Fig. 12). The differential 82 is controlled by a locking element 86 carried in the subframe. This locking element 86 cooperates with two opposed locking elements 87 and 88 (Figs. 4 and 11) of the differential shafts in such manner that when it comes out of engagement with one of the opposed locking elements it immediately is in engagement with the other, so that one of the two differential shafts is always free while the other is locked. Upon the locking element 88 there is provided a tooth 90, which, upon the assumption that the corresponding member is freed for a movement by the locking slide bar 86, toward the end of each revolution again so shifts the said locking slide bar that the shaft 84 is again locked. The shaft 84 is therefore always free only to the extent of one revolution.

The slide bar 86 is driven by the gear wheels 91 of the multiplying mechanism 62 (Figs. 4, 9 and 10).

Small shifting lugs 92 (Figs. 9 and 10) are secured to the gear wheels 91, which depress the lever 94 when the numeral disc 93 secured to the gear wheel 91 passes from "one" to "zero". The lever 94 swings the angle lever 95 by means of an extension 94a having an inclined surface 94b, to such extent that the latter, through an intermediate member 96 (Fig. 4), moves longitudinally a slide bar 97 arranged upon the previously mentioned locking slide bar 86, and thereby carries along the locking slide bar 86 in its movement, by means of the spring 86a. In case any place of the multiplier is equal to "zero", the register mechanism moving device must be twice successively engaged, and the shaft 84 must make two successive revolutions. The yieldable connection of the slide bars 86 and 97, through spring 86a, enables the slide bar 97 (Fig. 4) to remain in the upwardly shifted position during two revolutions, while the slide bar 86 in Fig. 4 may transiently be shifted so far downwardly that the tooth 90 can pass through the notch of the slide bar 86 provided for the same. The register mechanism moving device of the calculating machine, as seen from Fig. 12, consists of a rack bar 98 secured to the register carriage in the ratchet teeth of which engages a moving pawl 99 operated from the shaft 84 through the eccentric 84a so that in case the shaft 84 runs free, upon every revolution of the same the carriage will be carried on for one decimal place.

After each movement of the register mechanism through one place a locking pawl 100 (Figs. 4 and 13) falls into a second row 98a of teeth arranged laterally of the rack bar 98 from tooth to tooth and secures the carriage in its position at the moment.

If the carriage moves beyond the position intended for the last place, then a cam 101 forces the locking pawl 100 out of the ratchet teeth while simultaneously a further pawl 103 under the tension of the spring 102 secures it in the disengaged position by engagement in the notch 100a in the pawl 100, so that after completion of the calculation the carriage is automatically drawn back into the initial position by means of the spring 104 and stands ready for a further calculating operation. If by shifting the bar 76 the main drive of the machine is engaged for a new calculation operation the pawl 103 is removed from its locking position by the bar 76, so that the locking pawl 100 again falls into the ratchet teeth 98a through the tension of spring 105.

The transporting pawl 112 is moved by the drive shaft 83 of the register drive mechanism 61 through an intermediate shaft and is guided by an elongated slot on the shaft 69a. The pawl 112 together with its drive are non-slidably mounted in the frame of the machine.

The shaft of the intermediate wheel 116 and the shaft 113 are mounted in the frame of the machine by means of holders 111, 118, and 119, whereby the shaft 62a is mounted in the intermediate walls 120a and 120b of the register housing.

The shaft 113 rotates at the same speed as the shaft 83 so that upon every revolution of the shaft 83 the pawl 112 turns the wheels 32 and 91 to an extent corresponding to the numerical value "one" back toward the zero position.

Let it be assumed that in the calculating machine the multiplicand is already introduced into the register actuators 61 from the factor setting pin carriage 13, by rendering the transfer mechanism operative by means of the multiplicand key 43, and furthermore that the multiplier is already pre-set in the carriage 13. In order to introduce the multiplier into the multiplication mechanism, the multiplier selector key 63 is depressed. This energizes the electric motor 15 and connects it with the drive shaft 20 and also engages the transfer mechanism with the setting elements of the multiplier mechanism.

In accordance with the invention, the multiplier key 63, with the assistance of the connecting rod 64, the pin 121b, and the lever 121, rotatable about the screw 121a, shifts a slide 122, which has a narrow part 122b in the field of motion of a separate pin 13c on the carriage 13 and a pin 123 on an angle lever 124. This shift of the slide 122 brings its wide end 122a into the field of movement of the pins 13c and 123.

The transfer mechanism, as previously described, after each transfer of a factor, returns the carriage 13 to the right into its initial position by means of cam gearing moved by the shaft 20 (Fig. 6).

When upon depressing the multiplier key 63, the slide 122 has its wide portion 122a in the field of movement of the pins 13c and 123, then upon the return of the setting pin carriage 13, the pin 13c at the end of its return movement encounters the slide 122 and pushes it somewhat to the right, against the abutment pin 123 of the angle lever 124 and thereby produces a swinging of the angle lever 124 about the pivot point 125. The angle lever 124, by means of the abutment 76a shifts the slide 76, which closes the contacts 81 and releases the clutch pawl 78, so that the motor 15 will be supplied with current and the driver 77 and the clutch disc 79 will become connected to one another. The motor 15 now drives the main drive shaft 61c of the calculating machine, through the shaft 126, worm gear 127, clutch 78, 77, and 76, shaft 80, differential gear 82 and bevel gears 128 and 131. The further carrying-out of the calculating operation then proceeds.

After the completion of the transfer of the multiplier and the return of the factor setting carriage 13 to the initial position, the shaft 20 of the transfer mechanism releases a locking means which heretofore has held the multiplier selecting key 63 in the depressed position. The multiplier key and the parts moved thereby, particularly also the slide 122, then, under the action of springs, return again to their initial positions.

Thus, immediately after the engagement of the drive means, the narrow part 122b of the slide 122 is brought between the pins 13c and 123. The angle lever 124 therefore is no longer forced to the right by the slide 122, so that after the multiplication is completed the shifting rod 76 of the main drive mechanism and the angle lever 124 of the multiplying mechanism can be again set back and the drive mechanism can be again disengaged.

If the transfer mechanism is set into action by depressing the multiplicand key 43, in order to transfer a numerical value into the calculating machine as a multiplicand, and, if, after this transfer, the factor setting carriage is brought back into the initial position, then no setting into engagement of the machine drive mechanism occurs, because the slide 122 is not shifted by the multiplicand key and the pin 13c of the factor setting carriage cannot act upon the pin 123 of the angle lever 124 through the slide 122. Therefore, if first the multiplicand be transferred into the actuators of the register, and then the multiplier into the multiplying device, the main drive of the calculating machine will be operative only after both factors have been transferred into the machine. This is necessary because the calculation can be carried out only after both factors have been transferred from the factor setting carriage.

The machine could also be so constructed that the intermediate element 122 by means of which the factor setting carriage 13 moves the shifting rods 124 and 76 of the main drive mechanism, is brought into the active position by the multiplicand key (instead of by the multiplier key as described). The multiplier is first set into the multiplying device and only then the multiplicand is transferred into the register actuators, whereupon the main drive means is engaged only after both factors have been set up. It is therefore unimportant as to the invention which of the two selector keys brings the intermediate member 122 into its active position. It is important, however, that only one of the two selector keys should affect the intermediate element 122.

The setting discs 61a are restored to zero by the zeroizing of the register wheels 106. These register wheels 106 are zeroized by mechanism similar to that disclosed in German Patent No. 408,894.

I claim as my invention:—

1. An automatic multiplying machine, comprising a drive, a register, register actuators, mechanism co-operative with the actuators to effect multiplication, a factor presetting device, means selectively operative to transfer the value from the presetting device to the register actuators as multiplicand or to the mechanism to effect multiplication as multiplier, means including selective determination means to connect the drive to said transfer means to cause such transfer of the factors set up in the factor presetting device, means for engaging the drive with the register actuators to carry out multiplying operations, a member movable from a normal position at the beginning of each factor setting and returned to normal position at the end of each factor transfer, and a device movable from an inoperative position into a position in the return path of said member upon setting the selective determination means for one of its modes of operation, said device when thus moved establishing driving connection between said member and the last mentioned drive engaging means at the end of said return path, to carry out the multiplication of the transferred factors.

2. An automatic multiplying machine, comprising a drive, a register, register actuators, mechanism co-operative with the actuators to effect multiplication, a factor presetting carriage traversable from and to a normal position, means selectively operative to transfer the value from the presetting device to the register actuators as multiplicand or to the mechanism to effect multiplication as multiplier, means to connect the drive to said transfer means to cause such transfer of the factors set up in said carriage, a multiplicand key and a multiplier key for operating said connecting means, means for engaging the drive with the register actuators to carry out multiplications, a drive pin projecting from said carriage, and a device movable by the multiplier key from an inoperative position into the return path of the drive pin, said device when thus moved establishing driving connection between the drive pin and the last mentioned drive engaging means at the end of its return path to carry out the multiplication of the transferred factors.

AUGUST KOTTMANN.